Jan. 22, 1929.　　　　　　　J. C. SCHWARTZ　　　　　　1,699,859
METHOD OF MAKING DENTURES
Filed Sept. 13, 1926　　　2 Sheets-Sheet 1

INVENTOR
Jacob C. Schwartz.
By Ralph Reich
ATTORNEY

Jan. 22, 1929.  J. C. SCHWARTZ  1,699,859
METHOD OF MAKING DENTURES
Filed Sept. 13, 1926   2 Sheets-Sheet 2

INVENTOR
Jacob C. Schwartz
By Ralph Reich
ATTORNEY

Patented Jan. 22, 1929.

1,699,859

UNITED STATES PATENT OFFICE.

JACOB C. SCHWARTZ, OF ST. LOUIS, MISSOURI; BERTHA SCHWARTZ AND THE MERCANTILE TRUST COMPANY EXECUTORS OF JACOB C. SCHWARTZ, DECEASED.

METHOD OF MAKING DENTURES.

Application filed September 13, 1926. Serial No. 135,143.

This invention relates generally to prosthetic dentistry and, more particularly, to a certain new and useful improvement in methods of making dentures.

Briefly, according to the present-day practice of constructing sets of artificial or false teeth, commonly known as dentures, so far as I am aware, the several teeth are initially mounted to correct alignment and occlusion in plastic wax. The teeth, as so mounted, are then placed in a sectional molding-flask, and liquid or fluid plaster-of-Paris poured in to fill the mold and on hardening form a so-called intermediate base for the teeth. The flask is thereupon closed, and the plaster permitted to set and harden. To now soften for removal the initial wax base, the flask or mold is immersed in hot water which effects a softening of the initial wax base, so that it may be subsequently, and prior to rubber vulcanite packing, removed, but at the same time the plaster is so more or less water-soaked as to impair its rigidity and grip upon the teeth for maintaining the teeth, during the remaining denture-forming steps, in their original alignment for perfect occlusion. Following such wax-softening step, the flask is opened and the softened wax removed, the teeth being now supported by and set in the so relatively hardened plaster, which thus functions as an intermediate base for the teeth. Rubber vulcanite being now packed upon the intermediate base and about the teeth, the flask is again closed and subjected to pressure to compact the rubber vulcanite prior to vulcanization. The flask is then disposed within a suitable vulcanizing apparatus to effect thorough and complete vulcanization of the rubber vulcanite. Following vulcanization, the flask is opened, the cast taken therefrom, and the plaster suitably removed, leaving the teeth set in the hardened and vulcanized rubber, which forms the final base and mounting of the teeth. During, however, such vulcanite compacting step or operation, due to the water-soaked condition and hence impaired rigidity and firmness of the temporary or intermediate plaster base, the original alignment of the teeth for the desired occlusion is very frequently so affected that the final denture is faulty and imperfect.

My present invention has hence for its object the production, in an economical, efficient, and readily practiced manner, of dentures which uniformly and substantially perfectly embody the teeth in and according to their original alignment and setting for the desired occlusion.

And with such ultimate object in view, my invention resides both in the final denture itself and in novel steps in the method or process of constructing the same, as hereinafter described and pointed out in the claims.

In practicing my process or method and in the production of the denture, I preferably employ certain relatively simple apparatus and equipment, and in the accompanying drawings,—

Figure 1:
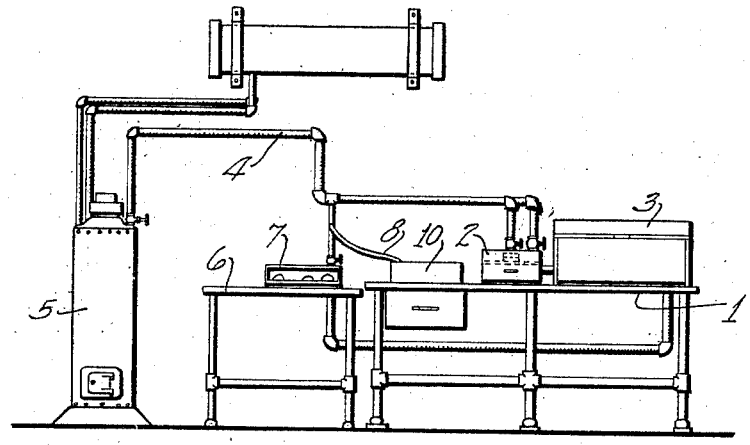
Figure 1 illustrates in elevation a dry-steam apparatus such as is preferably employed in practicing my method and in the formation of my new denture.

Referring now more in detail and by reference characters to the drawings, the apparatus and equipment employed in the practicing of my new dentures may be described as including a work-table 1, at which various of the denture-forming operations may be conveniently performed. Disposed on table 1, is an oven or dry heat-chamber 2 and a water-containing receptacle or tank 3, the chamber or oven 2 and the water in tank 3 being heated by steam or other medium furnished through valve-controlled piping 4 from a suitable generating-furnace 5 or other source of supply. Preferably adjacent table 1, is a second or auxiliary table 6, upon which is located a suitable tank 7, adapted for co-operation with which is a flexible hose 8 having suitable supply-connection with the piping 4 and carrying a suitable spraying-nozzle (not shown) preferably, when not in use, permitted to rest within a tank or receptacle 10 mounted for convenience on table 1.

Figures 2, 3:
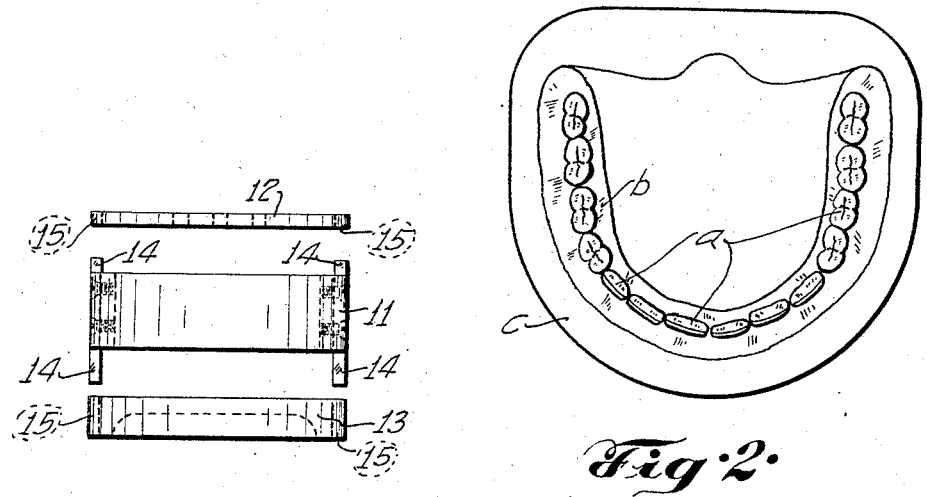
Figure 2 is a plan view of the several teeth as first or initially set in wax to correct occlusion and alignment.
Figure 3 illustrates a common type of molding-flask employed in the production of the denture, the parts or sections of the flask being in separated assembling relation.

Now, in the formation of the dentures, the several false or artificial teeth $a$ are first set to correct alignment and occlusion in an initial base $b$ of plastic wax or other suitable material or compound, and the wax base $b$ then arranged upon a preferably rigid plaster or other hard plate $c$, as shown in Figure 2.

Figure 4:
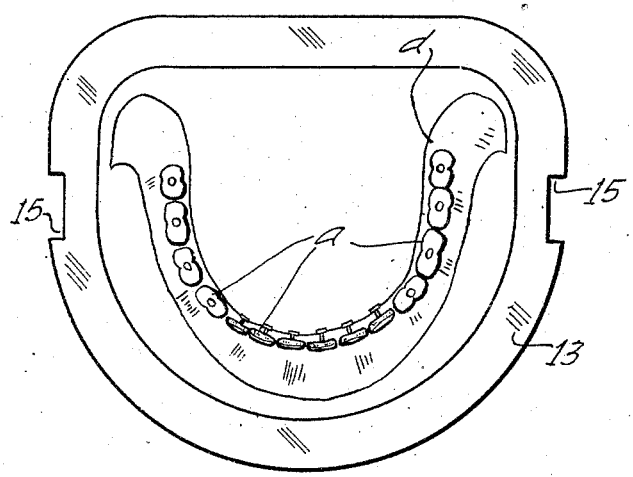
Figure 4 illustrates the several teeth as set in the intermediate plaster-of-Paris base and prior to the packing therearound of the rubber-vulcanite, sections of the mold being removed.

Employing now preferably the flask or mold shown in Figure 3, which, as there shown, is of sectional construction comprising a main or body-portion 11, a lid or end-member 12, and a bottom or second end-member 13, the body member 11 being provided with tongues 14 adapted to register with slots 15 provided in the end-members 12 and 13, the plate $c$ and its superposed wax-base $b$ and set teeth $a$ are placed upon the one bottom-member 13 and enclosed within the body-portion 11. The flask or mold is then filled with plaster-of-Paris in a liquid or fluid state, so that the portions of teeth $a$ protruding from the wax-base $b$ are entirely covered by and with the fluid plaster. The opposite end-member 12 is now placed upon the body portion 11 and the flask closed. The plaster $c$ more or less quickly sets, and I might here observe that, in order that the matrix or hardened plaster $d$, see Figure 4, may be subsequently easily separated from the plaster or other plate $c$, a suitable separating compound may be disposed upon the initial hard plate $c$.

As the fluid plaster hardens, it will be evident that the upper portions of the teeth $a$ protruding from the wax-base $b$ become set in and are gripped by the plaster. Now, as I have heretofore stated, the present practice is to immerse the closed flask and initially set plaster-of-Paris in a tank of hot or boiling water in order to soften and in due course enable the removal of the initial wax-base $b$. This step has been considered essential and has been standard practice, so far as I am aware, for many years. The result of such immersion is, however, that, while the wax-base $b$ is softened, the plaster-of-Paris becomes so water-soaked that its rigidity is affected to such an extent as to lessen the firmness of its grip upon the teeth $a$, with the ultimate result that the teeth of the final denture are often out of their original correct alignment for the perfect occlusion desired. In my method of denture production, I entirely eliminate such water-soaking of the plaster-of-Paris and now place the so closed mold or flask in the oven or dry heat-chamber 2, where the flask is subjected for approximately fifteen minutes to a baking temperature of approximately 300° F. Such relatively slow baking or heating effects a softening of the initial wax-base $b$, but at the same time, by removing through evaporation the surplus moisture or water content of the plaster, thoroughly, uniformly, and completely hardens and rigidifies the plaster, with the result that the plaster firmly and tightly grips the several teeth in full accordance with their original wax-setting and is thereafter rigidly pressure-resisting. I may here state that I have found that best results are obtained in the employment of a baking period of approximately fifteen minutes at the temperature stated; it is to be understood, however, that variations in both the baking period and in the baking temperature may be effective in accomplishing my purpose. I might observe, however, that too prolonged baking or too great heat might tend to disintegrate the plaster and thus injuriously effect its efficiency in the performance of its functions.

Now, after such baking, the flask is taken from the oven 2 and inverted, when the one end-member 12 now becomes the bottom of the flask. The other end-member 13 is removed and therewith the hard plate $c$, the softened wax-base $b$ being then exposed. However, the teeth $a$ are now rigidly mounted in inverted position in the initially fluid, but now rigidly hard plaster $d$, which now functions as an intermediate base for the teeth. The flask with its contained hard plaster base $d$ and its rigidly held teeth $a$ are now disposed within the tank 7 and subjected to a jet of relatively high pressure steam ejected through the nozzle carried by the hose 8, which effects through blowing and washing a removal from the teeth $a$ of any remaining parts or particles of the initial wax base $b$ and also a thorough cleaning of the new base $d$. I might observe here that the steam used in this step of my denture-forming method has a temperature of preferably 300° F. and issues from the hose 8 under a pressure of approximately 75 to 85 pounds per square inch. The flask, so containing the base $d$ and its gripped teeth $a$, is, immediately following such wax-removal and cleaning operation, preferably placed within the oven 2 so as to effect by evaporation the removal of any surface moisture.

Figure 5:
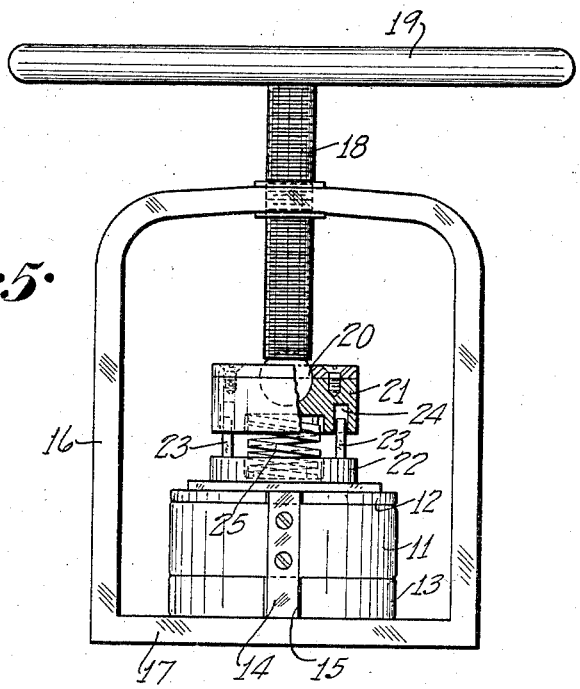
Figure 5 illustrates, partly in elevation and partly in section, a preferred type of press and mold employed in the compacting of the rubber-vulcanite of the denture prior to vulcanization.
Figure 6:
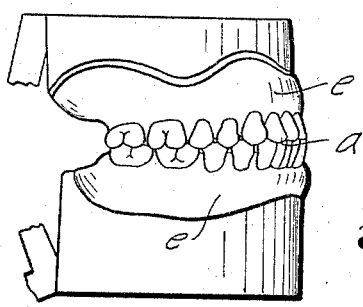
Figure 6 shows in elevation a co-operating or matching pair of the finished dentures in occludent relation.

On removal again from the oven 2, the usual rubber vulcanite in sheet or strip form is packed over the base $d$ and about the protruding portions of the teeth $a$, and the flask again completed by replacement of the end-member 13 and hard plate $c$. In view, however, of the interposed rubber vulcanite, the flask will not tightly close, and to now compact the vulcanite to effect a total closure of the flask for vulcanization, the flask is placed within a press of preferably the type illustrated in Figure 5. As there shown, this press comprises a frame 16 having a base 17 upon which the flask may rest. Mounted for rotatory movement in the frame 16, is a threaded rod 18 carrying at its one or upper end a hand-wheel 19. At its other or lower end, the rod 18 has a ball-joint connection, as at 20, with a presser-plate 21. The flask being interposed between the base 17 and the presser-plate 21, the presser-plate 21 is adapted for co-operation with a second or auxiliary presser-plate 22 seated upon the flask, the plates 21, 22 having means co-acting therebetween, as, for instance, dowels 23 upon one plate and registering slots 24 upon the other plate to receive the dowels so that vertical alignment of the plates is assured. A coil spring 25 is interposed between the plates for normally evenly spacing them apart, the spring having its ends seated in recesses provided therefor in the plates 21, 22, as shown, the ball-joint 20 providing substantially a universal movement of the presser-plates and insuring a firm uniform pressure of the plate 22 upon the flask.

The hand-wheel 19 is now actuated to compact to as great an extent as possible the rubber vulcanite. Such operation, however, is rarely, if ever, capable of completely closing the flask, due to the interposed thickness of the vulcanite, and the press with the so-contained partly open flask is hence now placed within the tank 3, with the flask out of direct contact with the water therein, but close enough thereto to be heated by the hot vapor arising therefrom. Such vapor, in turn, effects a softening of the rubber vulcanite, whereupon, without additional operation of the hand-wheel 19, but through the spring pressure exerted through and by the spring 25, the flask is gradually and automatically closed as the rubber vulcanite so softens and packs into place. I might say that such reheating and spring closing operation usually consumes from fifteen to twenty minutes.

After the flask is thus entirely closed, the press is taken from the tank 3 and the flask removed from the press and placed within a suitable vulcanizing apparatus of any standard type, not here shown, to effect vulcanization of the rubber vulcanite, which ultimately becomes the final and permanent base for the teeth $a$ and the plate proper of the denture. In due course, the flask is taken from the vulcanizing apparatus and opened and the plaster-of-Paris base or cast $d$ suitably removed from around the teeth, when the several teeth $a$ now appear in the finished denture firmly and solidly mounted within the hard vulcanized rubber $e$ in exactly the alignment and occlusion as when initially mounted in the soft wax base $b$.

Thus by my process I entirely eliminate mushy, water-soaked plaster and obtain firm, hard, pressure-resisting plaster that yields uniformly perfect dentures, in the production of which also the rubber is not "cooked" to a crusty, flaky consistency, the rubber vulcanite being compacted with forceful, evenly distributed pressure and, after vulcanization, the rubber retaining its life, resiliency, and toughness that enables the denture to withstand hard knocks and obviates breakage and repairs. And by my process, the dentures are uniform and precise and in correct articulation and occlusion, and further treatment and alterations of the dentures when fitting the same into the mouth are reduced to a minimum.

It will be evident that various modifications may be made in my denture-forming method without departing from the nature and spirit of my invention.

Having thus described my invention, what I claim and desire to secure by Letters Patent is:

1. Those steps in the construction of dentures which consist in subjecting the wax-set and plaster-covered teeth to dry heat for softening the wax and drying and hardening the plaster, and then blowing off the softened wax.

2. Those steps in the construction of dentures which consist in subjecting the wax-set and plaster-covered teeth to heat within an oven for softening the wax and drying and hardening the plaster in gripping engagement with the teeth, and then blowing off the softened wax.

3. Those steps in the construction of dentures which consist in baking the wax-set and plaster-covered teeth within an oven for softening the wax and drying and hardening the plaster in gripping engagement with the teeth, and then blowing off with dry steam the softened wax.

4. The method of constructing dentures which includes mounting the teeth upon an initial wax base, covering the mounted teeth and base with fluid plaster, subjecting the whole to heat in an oven to soften the wax and rigidly harden the plaster grippingly about the teeth, blowing off the softened wax, packing rubber vulcanite on the hardened plaster and that portion of the teeth previously set in the wax base, and then vulcanizing the rubber vulcanite.

5. The method of constructing dentures which includes mounting the teeth upon an initial wax base, covering the mounted teeth and base with fluid plaster, subjecting the whole to heat in a dry oven to soften the wax and rigidly harden the plaster grippingly about the teeth, subjecting the hardened plaster and teeth to a dry steam jet for blowing off the softened wax, packing rubber vulcanite on the hardened plaster and about the teeth, and vulcanizing the rubber vulcanite to form the final base for the teeth.

6. The method of constructing dentures which includes mounting the teeth upon an initial wax base, covering the teeth and base with fluid plaster, subjecting the whole to heat in a dry oven to soften the wax and rigidly harden the plaster grippingly about the teeth, the hardened plaster then functioning as an intermediate base for the teeth, blowing off the softened wax from the intermediate base and teeth, packing rubber vulcanite upon the intermediate base and about the teeth, reheating the whole while subjecting the rubber vulcanite to compacting yielding pressure, and then vulcanizing the rubber vulcanite to form the final base for the teeth.

7. The method of constructing dentures which includes mounting the teeth upon an initial wax base, disposing the teeth and base upon a hard plate and within a molding-flask, covering the plaster wax-base and teeth with fluid plaster and then closing the flask, subjecting the closed flask to heat in a dry oven to soften the wax and rigidly harden the plaster grippingly about the teeth, the hardened plaster then functioning as an intermediate base for the teeth, opening the flask and blowing off the softened wax from the intermediate base and about the teeth, packing rubber vulcanite upon the intermediate base and about the teeth, again closing the flask and subjecting the same to vulcanite compacting pressure, then subjecting the flask under yielding pressure to further heating to further compact the vulcanite, and then disposing the flask within a vulcanizing apparatus for vulcanizing the rubber vulcanite to form the final base for the teeth.

8. The method of constructing dentures which includes mounting the teeth upon an initial wax base, disposing the teeth and base upon a plate and within a molding flask, covering the plate, wax-base, and teeth with fluid plaster and then closing the flask, subjecting the closed flask to heat in a dry oven to soften the wax and rigidly harden the plaster grippingly about the teeth, the hardened plaster then functioning as an intermediate base for the teeth, opening the flask and blowing off the softened wax from the intermediate base and the teeth, packing rubber vulcanite upon the intermediate base and about the teeth, again closing the flask and subjecting the same to vulcanite compacting pressure, then subjecting the flask under constant spring pressure to dry heat to further compact the vulcanite, and then disposing the flask within a vulcanizing apparatus for vulcanizing the rubber vulcanite to form the final base for the teeth.

In testimony whereof, I have signed my name to this specification.

JACOB C. SCHWARTZ.